United States Patent
Kopplin

(10) Patent No.: US 11,215,294 B2
(45) Date of Patent: Jan. 4, 2022

(54) HANDLE FOR A COUPLER

(71) Applicant: Mann Teknik AB, Mariestad (SE)

(72) Inventor: Gerhard Kopplin, Lyrestad (SE)

(73) Assignee: MANN TEKNIK AB, Mariestad (SE)

( * ) Notice: Subject to any disclaimer, the term of this patent is extended or adjusted under 35 U.S.C. 154(b) by 0 days.

(21) Appl. No.: 16/910,628

(22) Filed: Jun. 24, 2020

(65) Prior Publication Data

US 2020/0408331 A1 Dec. 31, 2020

(30) Foreign Application Priority Data

Jun. 27, 2019 (SE) .................................. 1950798-7

(51) Int. Cl.
*F16K 31/60* (2006.01)
*F16L 37/38* (2006.01)

(52) U.S. Cl.
CPC ............ *F16K 31/602* (2013.01); *F16L 37/38* (2013.01)

(58) Field of Classification Search
CPC .......... F16K 31/602; F16L 37/38; B25G 1/10; B25G 1/102; E05B 1/0053
See application file for complete search history.

(56) References Cited

U.S. PATENT DOCUMENTS

| 2,307,392 | A | * | 1/1943 | Crane et al. | ............ F16K 31/60 |
| | | | | | 74/553 |
| 2,854,989 | A | | 6/1953 | Worlidge | |
| 3,041,089 | A | | 8/1959 | Purves | |
| 4,999,875 | A | * | 3/1991 | Rybak | ...................... F16K 31/60 |
| | | | | | 16/432 |
| 7,686,037 | B2 | * | 3/2010 | Krywitsky | .............. F16L 37/32 |
| | | | | | 137/614.04 |
| 2004/0050450 | A1 | | 3/2004 | Lambert | |
| 2011/0139302 | A1 | | 6/2011 | Pell | |
| 2014/0110616 | A1 | * | 4/2014 | Freeth | ................... F16K 35/027 |
| | | | | | 251/288 |
| 2018/0202593 | A1 | | 7/2018 | Hudson | |

FOREIGN PATENT DOCUMENTS

| CN | 103486372 | 1/2014 |
| SE | 1751098-3 | 3/2019 |
| WO | 2016091327 | 6/2016 |
| WO | 2016176538 | 11/2016 |
| WO | 2017153786 | 9/2017 |

* cited by examiner

*Primary Examiner* — Kevin L Lee
(74) *Attorney, Agent, or Firm* — Duane Morris LLP; Gregory Lefkowitz

(57) ABSTRACT

A coupler for a fluid transport system comprising a handle being continuous around the coupler, the coupler having a first end and a second end, the handle having a non-constant radius with respect to the central longitudinal axis of the coupler, the handle comprising a plurality of regions being proximal the first end of the coupler, and a plurality of regions being distal the first end of the coupler.

11 Claims, 3 Drawing Sheets

HANDLE FOR A COUPLER

CROSS-REFERENCE TO RELATED APPLICATION

This application claims priority of Sweden National Application No. 1950798-7, filed Jun. 27, 2019, the entire contents of which are incorporated herein by reference.

FIELD OF THE INVENTION

The present disclosure relates to couplers for a fluid transport system and in particular to couplers comprising handles surrounding the coupler and having a regions of non-constant radius.

BACKGROUND OF THE INVENTION

Fluid transfer systems are used to transfer a fluid from a source to a destination Large manually actuated valves are traditionally used as fluid conduit connection means in many types of fluid transport systems. In such systems, generally a member known as a coupler is attached to a conduit and a comprises an internal valve. The coupler may be attached to another member being an adapter, or a receiving member, on for example a tank or receptacle. A valve within the coupler may be manually actuated via rotation of a handle present on the coupler. The rotation of the handle results in closing of the valve within the coupler.

Valves may be for example dry-disconnect valves in which the internal valve within the coupler is closed prior to the valve being disengageable from the adapter.

The handles of such manually actuated couplers are typically designed as is shown in SE1751098-3 (FIGS. 1, 3 & 5). Field studies and ergonomic studies have shown that problems exist with such a handle design. It has been found that users do not hold the handle at its widest point. Users may hold the fluid conduit rather than the handle. And furthermore, when connecting the coupler to an adapter there may be limited space for the user's hands due to other components in the vicinity of the adapter.

An improved handle design for couplers is needed to improve the usability and ergonomics of couplers.

SUMMARY OF THE INVENTION

Accordingly, the present invention preferably seeks to mitigate, alleviate or eliminate one or more of the above-identified deficiencies in the art and disadvantages singly or in any combination and solves at least the above mentioned problems by providing a coupler for a fluid transport system comprising a handle being continuous around the coupler, the coupler having a first end and a second end, the handle having a non-constant radius with respect to the central longitudinal axis of the coupler, the handle comprising a plurality of regions being proximal the first end of the coupler, and a plurality of regions being distal the first end of the coupler.

A handle for a coupler is also provided.

Further advantageous embodiments are disclosed in the appended and dependent patent claims.

BRIEF DESCRIPTION OF THE DRAWINGS

These and other aspects, features and advantages of which the invention is capable will be apparent and elucidated from the following description of embodiments of the present invention, reference being made to the accompanying drawings, in which.

DETAILED DESCRIPTION

Figure 1:
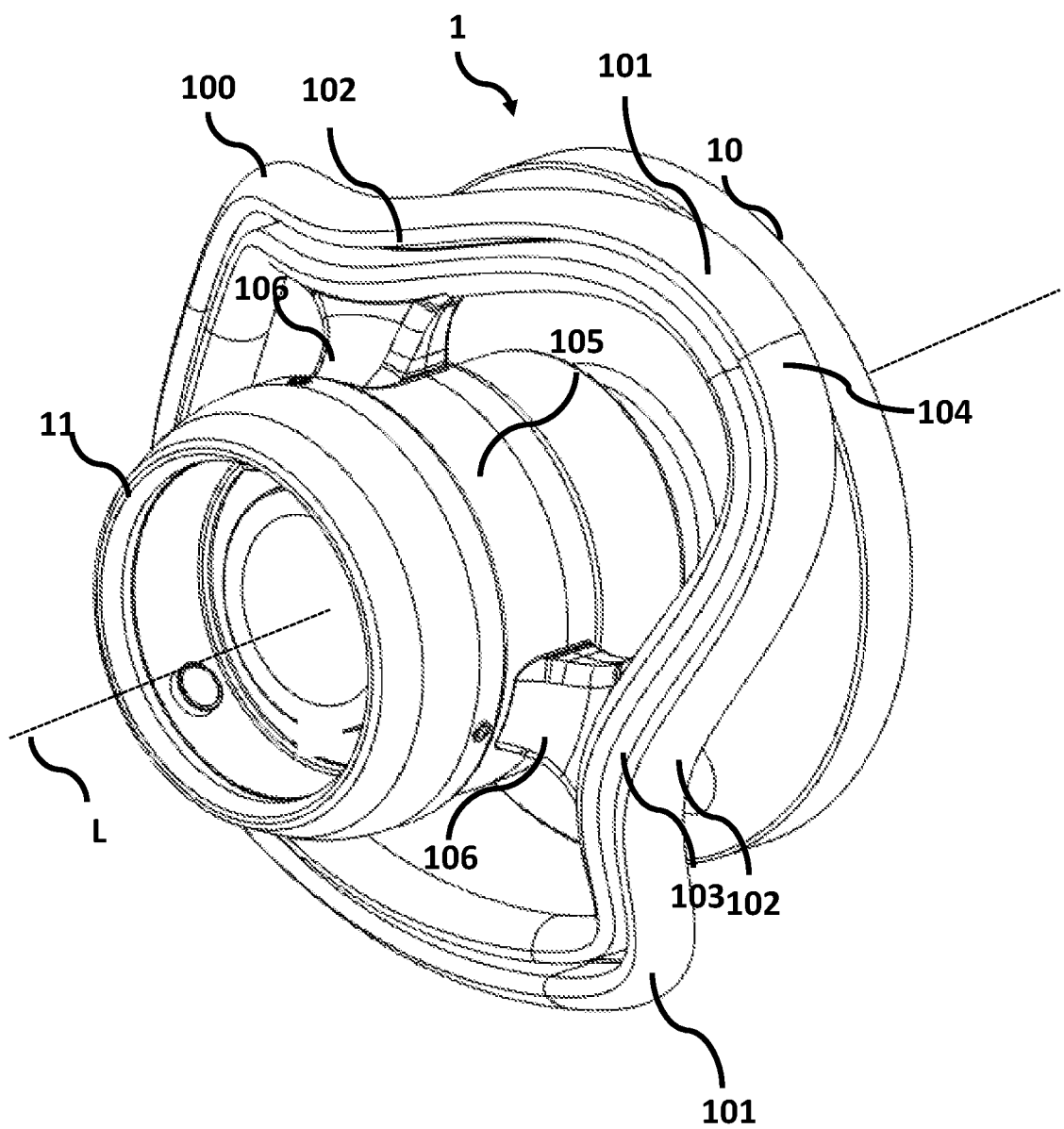
FIG. 1 is a perspective view of a coupler comprising a handle according to an aspect.

The present disclosure relates to a coupler 1 for a fluid transport system comprising a handle 100 being continuous around the coupler 1. The coupler 1 has a first end 10 and a second end 11. The handle 100 has non-constant radius with respect to the central longitudinal L axis of the coupler 1. The handle comprises a plurality of regions 101 being proximal the first end 10 of the coupler 1, and a plurality of regions 102 being distal the first end 10 of the coupler 1.

The handle 100 of the coupler 1 has improved handling properties and usability, can be more easily connected to a second fluid conduit and has therefore increased safety properties when hazardous fluids are being transferred through the coupler. By forming the handle 100 such that regions are proximal to and regions are distal from the first end 10 maneuverability of the coupler 1 is increased. Furthermore, the presence of both proximal and distal regions enables an operator to have multiple regions at which to place their hand to modify where the lifting force (of the operator's hands) is applied to the coupler.

At a plurality of regions 103 along the handle 100, the distance of the handle 100 from the central longitudinal axis L of the coupler 1, that is the radius of the handle 100 is reduced with respect to the other regions 104 of the handle 100. In such a manner the handle 100 can be considered to comprise a first plurality of undulations. Such first undulations are undulations with respect to the radius of the handle 100 from the coupler 1. The regions of reduced radius 103 are proximal the central longitudinal axis L of the coupler 1. The other regions 104, the regions of greater radius 104 are distal the central longitudinal axis L of the coupler 1.

The handle 100 may comprise more than two regions 103 of reduced radius, such as three regions 103. The handle may comprise more than two regions 104 wherein the radius is greater than the radius at the reduced regions 103. For example, the handle may comprise three regions 104 having a radius greater than the radius at the reduced radius.

Each of the regions of reduced radius 103 may be provided between two regions of greater radius 104. For example, the handle 100 may comprise a first region of greater radius 104, an adjacent region of reduced radius 103, and a second region of greater radius 104, the second region of greater radius 104 being adjacent the region of reduced radius 103. Such a pattern of regions of reduced-greater radius results in the undulating profile as described above.

As the handle 100 is a solid shape it has a thickness measured radially from the center of the coupler 1, and a width measured in line with the longitudinal axis L. When referring to the radius of the handle 100 above, and when referring to the distance of the handle from the first end 10, the terms refer to the entire thickness of the handle 100. The continuous peripheral edge 108 of the handle defines the outermost radius of the handle. The continuous central edge 107, closest the central longitudinal axis L defines the innermost radius of the handle. The regions of reduced radius 103 have a reduced central edge 107 radius and a reduced peripheral edge 108 radius with respect to radius of the central edge 107 and the peripheral edge 108 at the regions of greater radius 104.

The entire thickness of the handle 100 has a reduced radius at the regions of reduced radius 103. The entire thickness of the handle 100 has a greater radius at the regions of greater radius 104.

The continuous posterior edge 109 of the handle 100 distal the first end 10 of the coupler 1 defines the edge of handle 100 being the furthest distance from the first end 10 of the coupler 1. The continuous anterior edge 110 of the handle 100 proximal the first end 10 of the coupler defines the edge of the coupler being the closest distance to the first end 10 of the coupler 1. That is, the handle has a width. The regions being proximal 101 the first end 10 of the coupler 1 are proximal at both the anterior and posterior continuous edges 110, 109 being respectively proximal and distal the first end 10 of the coupler 1. The regions being distal 102 the first end 10 of the coupler are distal at both the posterior and anterior continuous edges 109, 110 being respectively distal and proximal the first end of the coupler 1.

The entire width of the handle is proximal the first end 10 of the coupler 1 at the regions being proximal the first end 10. The entire width of the handle 100 is distal the first end 10 of the coupler 1 at the regions being distal 102 the first end 10 of the coupler 1.

If the handle 100 is provided with three regions of reduced radius 103, and three regions of greater radius 104, then the handle has an approximately triangular form surrounding the coupler 1. Each of the regions of greater radius 104 forms therefore an apex of the handle 100. The triangular form enables better usability as the state of the valve, that is, whether it is open or closed, may be more easily determined than would be possible with a circular handle as the operator can check the alignment of one of the apexes of the triangular handle 100 to determine valve state. For example, if one of the regions of greater radius 104 are at the top of the coupler 1 when it is connected to an adapter or other mating member then the valve may be open. When two regions of greater radius 104 are at the top of the coupler 1 when it is connected to an adapter or other mating member then the valve may be closed. In comparison to a circular handle, for which there is no alignment reference, this enables better usability.

Figure 2:
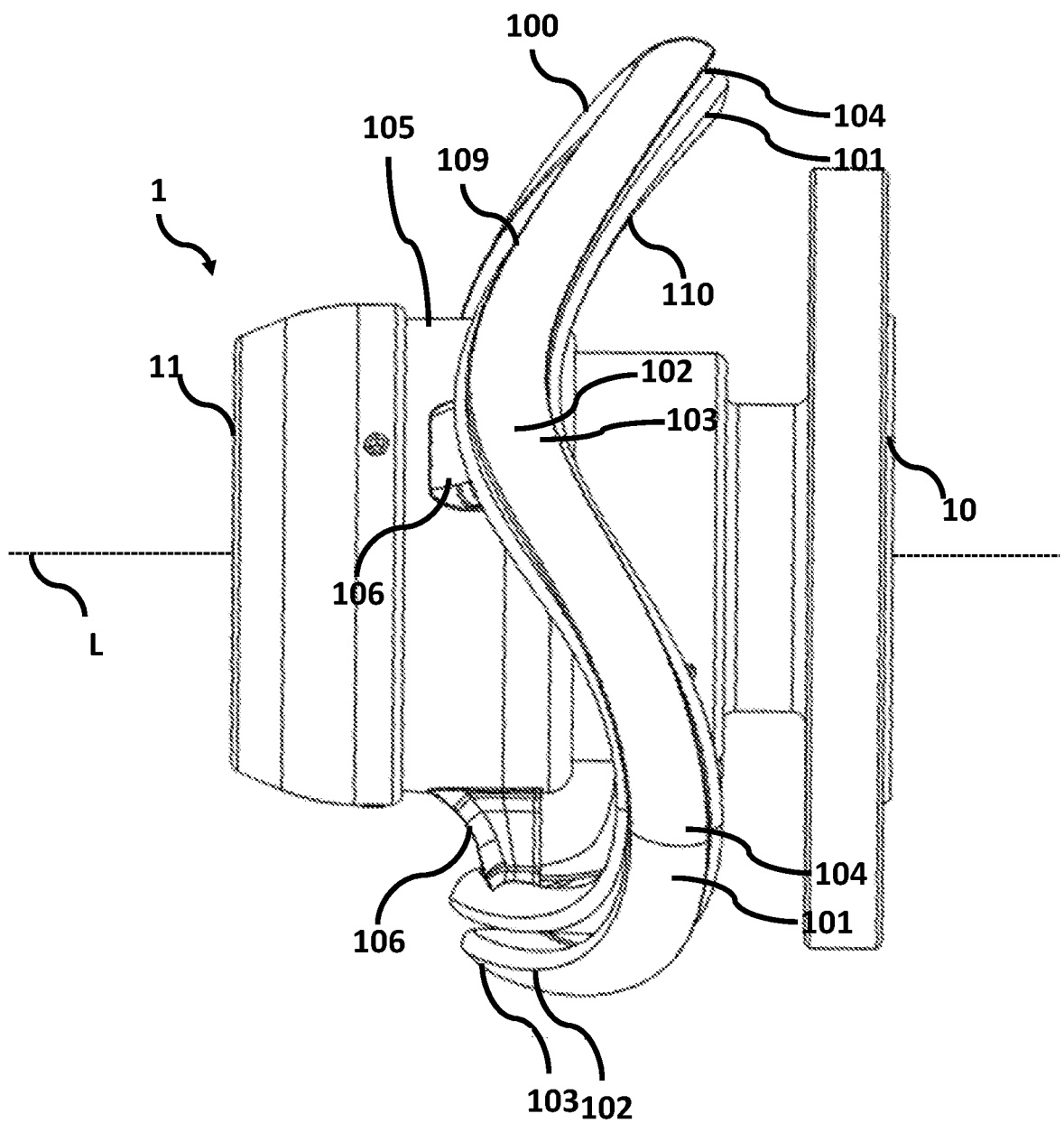
FIG. 2 is a side perspective view of a coupler comprising a handle according to an aspect.
Figure 3:
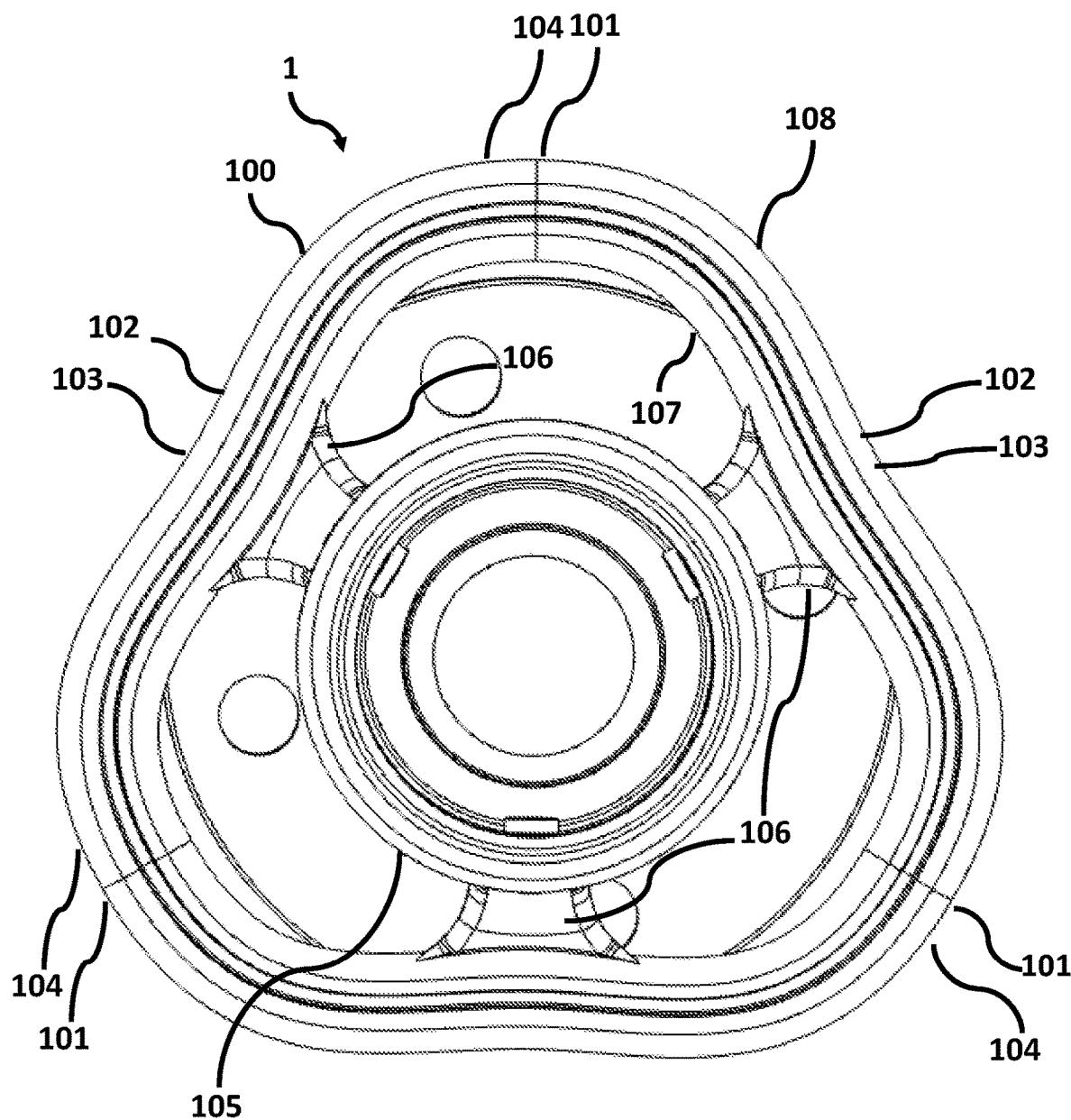
FIG. 3 is a rear perspective view of a coupler comprising a handle according to an aspect.

The handle 100 may comprises a plurality of regions 101 which are proximal a first end 10 of the coupler 1, and a plurality of regions 102 which are distal the first end 10 of the coupler 1. In such a manner the handle comprises a second plurality of undulations. The second undulations are undulations with respect to the distance of the handle 100 from the first end 10 of the coupler. The undulations may form a substantially sinusoidal form as shown in FIG. 2.

The coupler 1 may comprise a central hub 105 for attaching the handle 100 to the coupler 1. The hub 105 may be a sleeve attached around a central portion of the coupler 1. The central hub 105 may be operatively associated with a valve mechanism within the coupler 1. Rotating the handle 100, and therein the hub 105 opens or closes the valve within the coupler 1.

A plurality of connecting members 106 may extend between the hub 105 and the handle 100. The connecting members 106 may connect at a first end to the hub 105 and at a second end to the handle 100. The second end may connect to the regions being distal 102 the first end 10 of the coupler 1. The connecting members 106 connect the hub 105 and the handle 100 such that the handle 100 can actuate and rotate a portion of the coupler 1. The handle 100 may therein be used to actuate a valve and/or attachment mechanisms provided at the coupler 1. The attachment mechanisms may lock the coupler 1 to an adapter.

The connecting members 106 may extend from the hub 105 to the regions of reduced diameter 103 of the handle 100. By co-locating the extending members 106 with the regions of reduced diameter 103 of the handle 100 the space provided for a user or operator's hands is greatest at the regions of greater diameter 104. That is, there are no extending members present at the regions of greater diameter 104 which could obstruct an operator's hands. An operator is therefore more likely to grip the handle 100 at the regions 101 proximal the first end 10 of the coupler 1. This enables better alignment of the coupler 1 at the adapter during a coupling process.

Furthermore, by having the connecting members 106 extend from the hub 105 to the regions of reduced diameter 103 the connecting members 106 are short, and are generally not possible to grasp in the hands of the operator. This leads to the operator not attempting to hold the connecting members 106 but rather the handle 100 which leads to improved ergonomics and reduced injury of the operator.

The handle may comprise three connecting members 106, each of the three connecting members 106 extending from a region of reduced diameter 103.

As described above, the handle is non-circular.

The coupler 1 as described herein may be considered a hose-unit or simply a valve member for a fluid conduit. As the handle 100 is designed for improved usability and safety it is ideally suited to use where an operator must move the valve member and connect it to another valve member.

The handle 100 is especially suitable for valve members forming a fluid conduit through the central longitudinal axis L of the coupler/valve member. A flexible fluid conduit may extend from the second end 11 of the coupler 1.

Although, the present invention has been described above with reference to specific embodiments, it is not intended to be limited to the specific form set forth herein. Rather, the invention is limited only by the accompanying claims.

In the claims, the term "comprises/comprising" does not exclude the presence of other elements or steps. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A coupler for a fluid transport system, the coupler comprising, a handle being continuous around the coupler, wherein
   the coupler includes a first end and a second end,
   the handle has a non-constant radius with respect to a central longitudinal axis of the coupler,
   the handle includes a plurality of regions being proximal to the first end of the coupler and a plurality of regions being distal to the first end of the coupler,
   a fluid conduit is defined along the central longitudinal axis of the coupler, and
   the plurality of regions being proximal to the first end of the coupler and the plurality of regions being distal to the first end of the coupler define undulations with respect to a distance of the handle from the first end of the coupler.

2. The coupler according to claim 1, wherein the handle further comprises a plurality of regions of reduced radius and a plurality of regions of greater radius with respect to the central longitudinal axis of the coupler.

3. The coupler according to claim 2, wherein the regions of reduced radius and the regions of greater radius form undulations with respect to the radius of the handle.

4. The coupler according to claim 2, wherein at the regions of reduced radius both central and peripheral edges of the handle have a reduced radius with respect to the central and peripheral edges respectively at the regions of greater radius.

5. The coupler according to claim 1, wherein at the regions being proximal the first end of the coupler the anterior edge and the posterior edge of the handle are proximal the first end, with respect to respectively the anterior edge and posterior edge of the distal regions of the handle.

6. The coupler according to claim 2, wherein the regions of reduced radius are at the regions being distal the first end of the coupler, and the regions of greater diameter are at the regions being proximal the first end of the coupler.

7. The coupler according to claim 1, further comprising a hub and a plurality of extending members connecting the handle to the hub, each of the plurality of extending members connecting at a first end to the hub and at a second end to the regions being distal the first end of the coupler, the hub being operatively associated with a valve within the coupler such that rotating the handle, and therein the hub opens or closes the valve within the coupler.

8. The coupler according to claim 1, wherein the undulations are sinusoidal.

9. A handle for a coupler, the coupler including a first end and a second end, wherein
 the handle is continuous around the coupler and has a non-constant radius with respect to a central longitudinal axis of the coupler,
 the handle includes a plurality of regions being proximal to the first end of the coupler and a plurality of regions being distal to the first end of the coupler,
 a fluid conduit is defined along the central longitudinal axis of the coupler, and
 the plurality of regions being proximal to the first end of the coupler and the plurality of regions being distal to the first end of the coupler define undulations with respect to a distance of the handle from the first end of the coupler.

10. The handle according to claim 9, wherein the handle further comprises a plurality of regions of reduced radius and a plurality of regions of greater radius with respect to the central longitudinal axis of the coupler.

11. The handle according to claim 9, wherein the undulations are sinusoidal.

* * * * *